US011363310B2

(12) United States Patent
Shintani et al.

(10) Patent No.: US 11,363,310 B2
(45) Date of Patent: Jun. 14, 2022

(54) ATSC 3.0 HOSPITALITY TV SYSTEM

(71) Applicant: Sony Corporation, Tokyo (JP)

(72) Inventors: Peter Shintani, San Diego, CA (US); Adam Michael Goldberg, Fairfax, VA (US); Graham Clift, Poway, CA (US); Luke Fay, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/026,868

(22) Filed: Sep. 21, 2020

(65) Prior Publication Data

US 2022/0094992 A1    Mar. 24, 2022

(51) Int. Cl.
*H04N 21/214*   (2011.01)
*H04N 21/41*    (2011.01)
*H04N 19/146*   (2014.01)

(52) U.S. Cl.
CPC ....... *H04N 21/2143* (2013.01); *H04N 19/146* (2014.11); *H04N 21/4122* (2013.01)

(58) Field of Classification Search
CPC ............. H04N 21/2143; H04N 19/146; H04N 21/4122
See application file for complete search history.

(56) References Cited

U.S. PATENT DOCUMENTS

| | | | | |
|---|---|---|---|---|
| 2008/0120675 A1* | 5/2008 | Morad | ................ | H04N 21/4622 348/E7.071 |
| 2010/0325672 A1* | 12/2010 | Barnett, Jr. | .......... | H04N 21/239 725/81 |
| 2011/0099598 A1* | 4/2011 | Shin | ..................... | H04N 21/478 725/116 |
| 2016/0248828 A1* | 8/2016 | Kitahara | ............. | H04L 65/1069 |
| 2017/0041643 A1* | 2/2017 | Yamagishi | ......... | H04N 21/6112 |
| 2019/0037052 A1* | 1/2019 | Deshpande | ............ | H04L 45/74 |
| 2019/0327500 A1* | 10/2019 | Yang | .................. | H04N 21/2381 |

FOREIGN PATENT DOCUMENTS

| | | | | |
|---|---|---|---|---|
| WO | WO-02089479 A2 | * | 11/2002 | ......... H04N 21/2143 |
| WO | WO-2016056412 A1 | * | 4/2016 | ............. H04H 20/26 |
| WO | WO-2017146157 A1 | * | 8/2017 | ............. H04L 45/74 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Recommended Practice: Techniques for Signaling, Delivery and Synchronization (A/351)", Aug. 28, 2019.
"ATSC Standard: ATSC 3.0 Interactive Content (A/344)", May 2, 2019.

(Continued)

*Primary Examiner* — Robert J Hance
(74) *Attorney, Agent, or Firm* — John L. Rogitz

(57) ABSTRACT

Techniques are described for using the Advanced Television Systems Committee (ATSC) 3.0 television protocol in robustly delivering TV programming to hospitality establishments such as hotels without the need for set-top boxes or set-back boxes.

23 Claims, 6 Drawing Sheets

(56) References Cited

OTHER PUBLICATIONS

"ATSC Standard: ATSC 3.0 Security and Service Protection (A/360)", Aug. 20, 2019.
"ATSC Standard: ATSC 3.0 System (A/300)", May 15, 2020.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Cerlilicate Status Protocol (OCSP) Profile for High-Volume Environments," A. Deacon, R. Hurst, Internet Engineering Task Force, Fremont, CA, Sep. 2007.

* cited by examiner

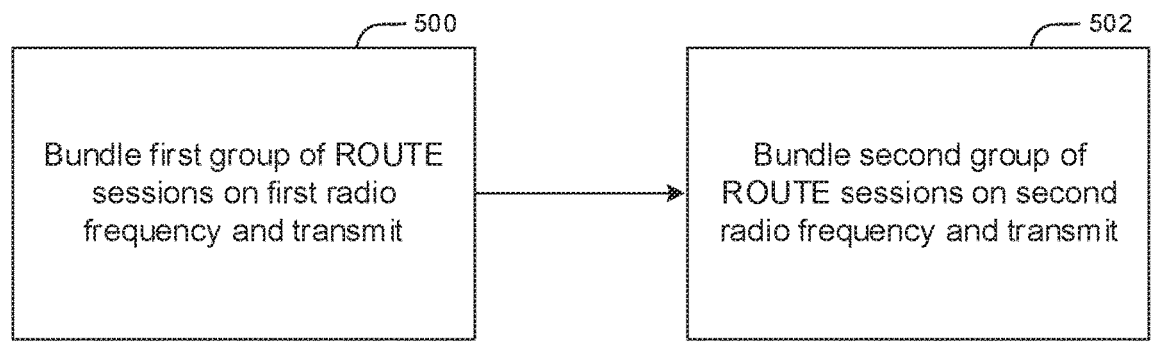
FIG. 5
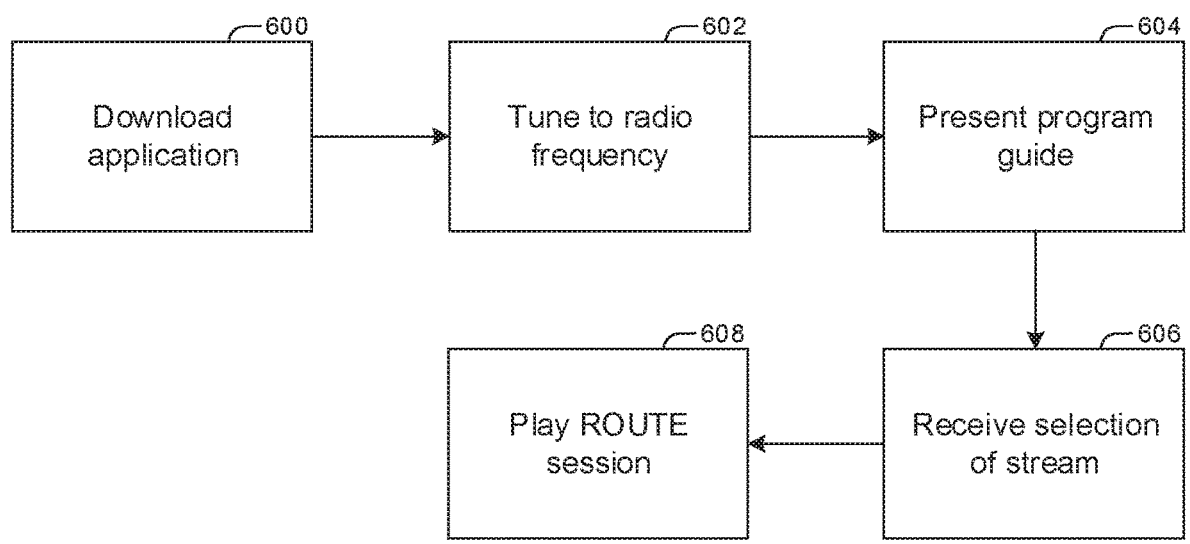
FIG. 6   TV

ATSC 3.0 HOSPITALITY TV SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including, but not limited to, televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, hospitality establishments such as hotels use TVs in conjunction with set-top boxes (STB), or TVs modified to have an internally concealed set back box (SBB) or set box functions implemented internally to integrate the TVs into the hotel TV system. STB use entails mounting and typically concealing the STB and, of course, the cost associated with procuring the STB, while SBB use entails the cost of the SBB and modifying the TV chassis for insertion of the SBB. Furthermore, because a STB or SBB is used, hardware in the TV such as one or more video decoders are not used, rendering these hardware components (for which licenses often must be paid) unused.

Accordingly, present principles recognize the desirability of eliminating the need for STB/SBB in hotel TV systems, while not requiring decommissioning of the TV at the end of its service in the hotel TV system, using unmodified mass-market televisions without any hospitality-specific hardware or software. Such TV systems facilitate development of hotel-specific features such as logos, and integration with other hotel systems (room service, etc.) using off-the-shelf development tools.

A digital television system includes at least one hospitality system server with at least one server processor programmed with instructions to receive plural audio video (AV) streams and establish a real-time object delivery over unidirectional transport (ROUTE) session for each AV stream. The instructions are executable to associate each ROUTE session with a respective layered coding transport (LCT) channel. The instructions are further executable to transmit plural LCT channels for multiple audio tracks, or closed captioning. Furthermore, instructions are executable for multiple ROUTE sessions over a single radiofrequency (RF) to plural TVs in a hospitality establishment for selection of AV streams for play on the TVs. The TVs do not receive data from set-top boxes (STBs) or set-back boxes (SBBs). Each TV can be in a respective room or space in the establishment. In some aspects, at least one ROUTE session may be sent over at least one RF.

In some embodiments the TVs are advanced television systems committee (ATSC) 3.0 TVs. In example implementations the system includes the TVs, at least some of which are disposed in respective hotel guest rooms. At least one of the TVs can be disposed in a public room of a hotel other than a hotel guest room.

In example embodiments the instructions may be executable to send to the TVs at least one application operable to select an AV stream from the single RF. The application may be an advanced television systems committee (ATSC) 3.0 application configured to present a user interface.

In non-limiting embodiments the plural ROUTE sessions are first ROUTE session, the single RF is a first RF, the TVs are first TVs, and the instructions are executable to transmit second ROUTE sessions on a single second RF to plural second TVs in the hospitality establishment. The first TVs are on a first floor or first set of floors in the hospitality establishment, while the second TVs are on a second floor or second set of floors in the hospitality establishment.

In other non-limiting embodiments the plural ROUTE sessions are first ROUTE sessions, the single RF is a first RF, the TVs are first TVs, and the instructions are executable to transmit second ROUTE sessions on a single second RF to plural second TVs in the hospitality establishment. The first ROUTE sessions carry content of a first type (e.g., for general audiences), while the second ROUTE sessions carry content of a second type (e.g., for mature audiences).

In another aspect, a method includes arranging plural real-time object delivery over unidirectional transport (ROUTE) sessions and/or plural motion pictures expert group (MPEG) media transport protocol (MMTP) sessions and/or plural hypertext transfer protocol (HTTP) sessions into respective RF channels. The method also includes broadcasting on a single radiofrequency (RF) from a hospitality establishment source to plural TVs in respective spaces of the hospitality establishment, and/or sending the sessions over a wired and/or wireless computer network link from the hospitality establishment source to the plural TVs.

In another aspect, an assembly includes at least one server associated with a hospitality establishment and plural TVs in respective spaces of the hospitality establishment. The plural TVs include advanced television systems committee (ATSC) 3.0 receivers configured to receive audio video (AV) programs from the server without use of set-top boxes or set-back boxes.

The details of the present application, both as to its structure and operation, can best be understood in reference to the accompanying drawings, in which like reference numerals refer to like parts, and in which:

BRIEF DESCRIPTION OF THE DRAWINGS

FIGS. 4 and 5 illustrate example system server logic in example flow chart format;

FIG. 6 illustrates example TV logic in example flow chart format; and

DETAILED DESCRIPTION

Figure 1:
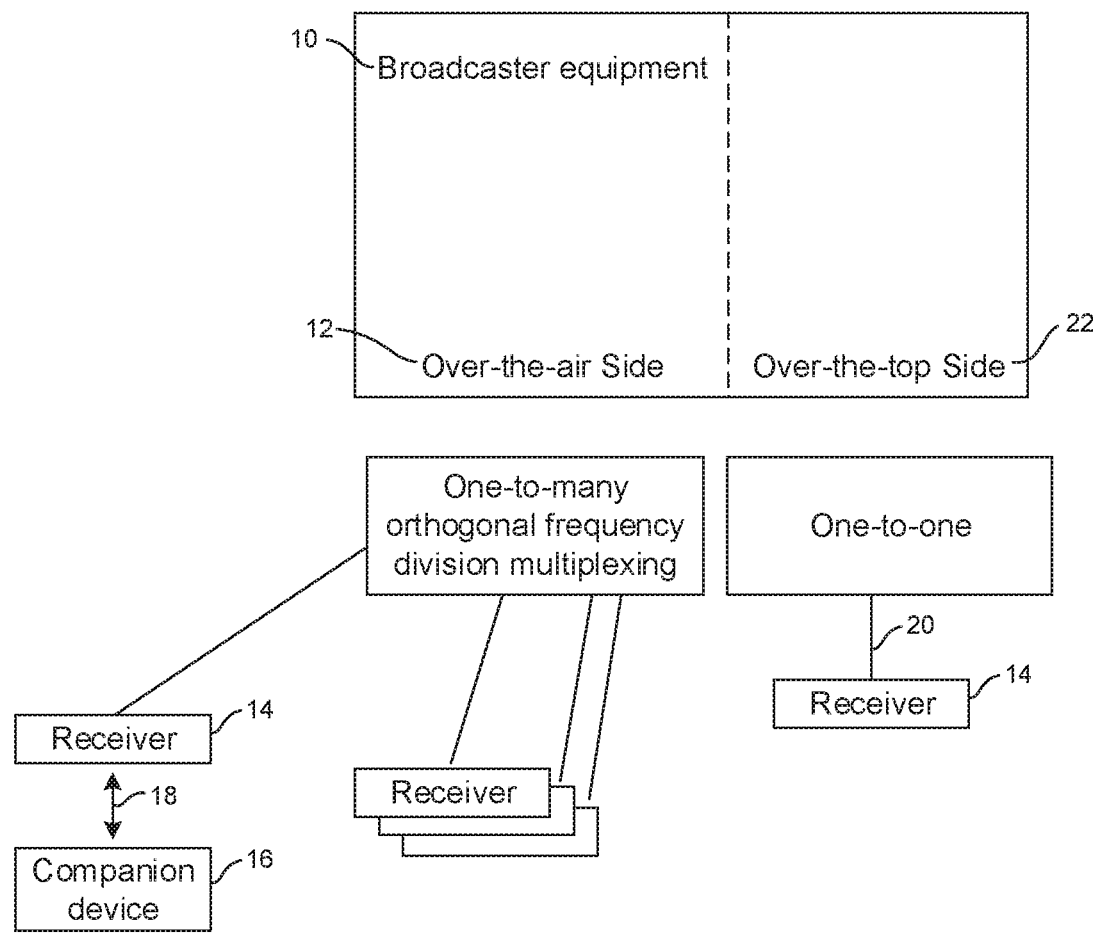
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
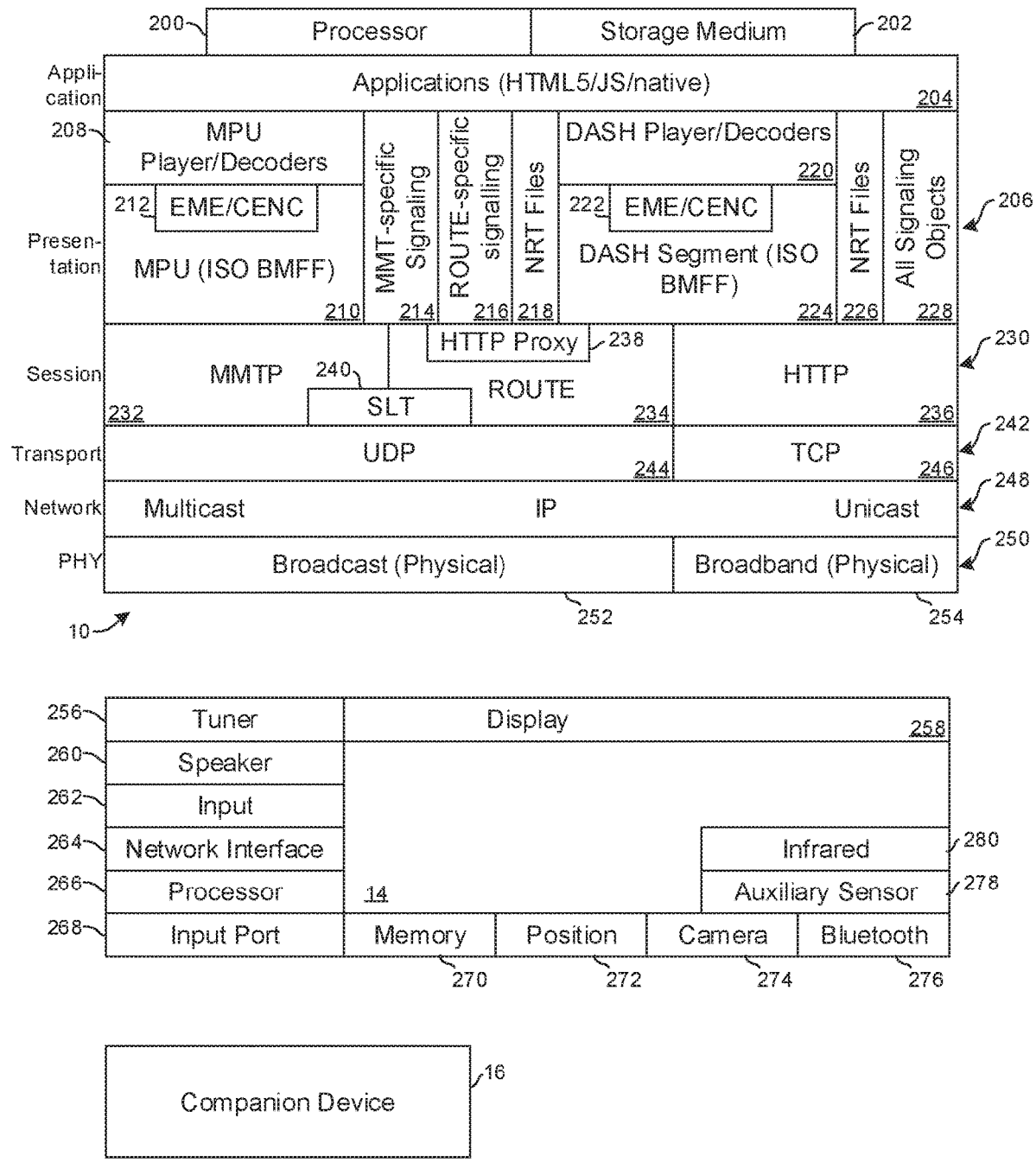
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements. Audio video (AV) streams are contained in ROUTE sessions. Layered coding transport (LCT) channels are setup within a ROUTE session. Each LCT channel carries either video or audio or captions or other data.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

Figure 3:
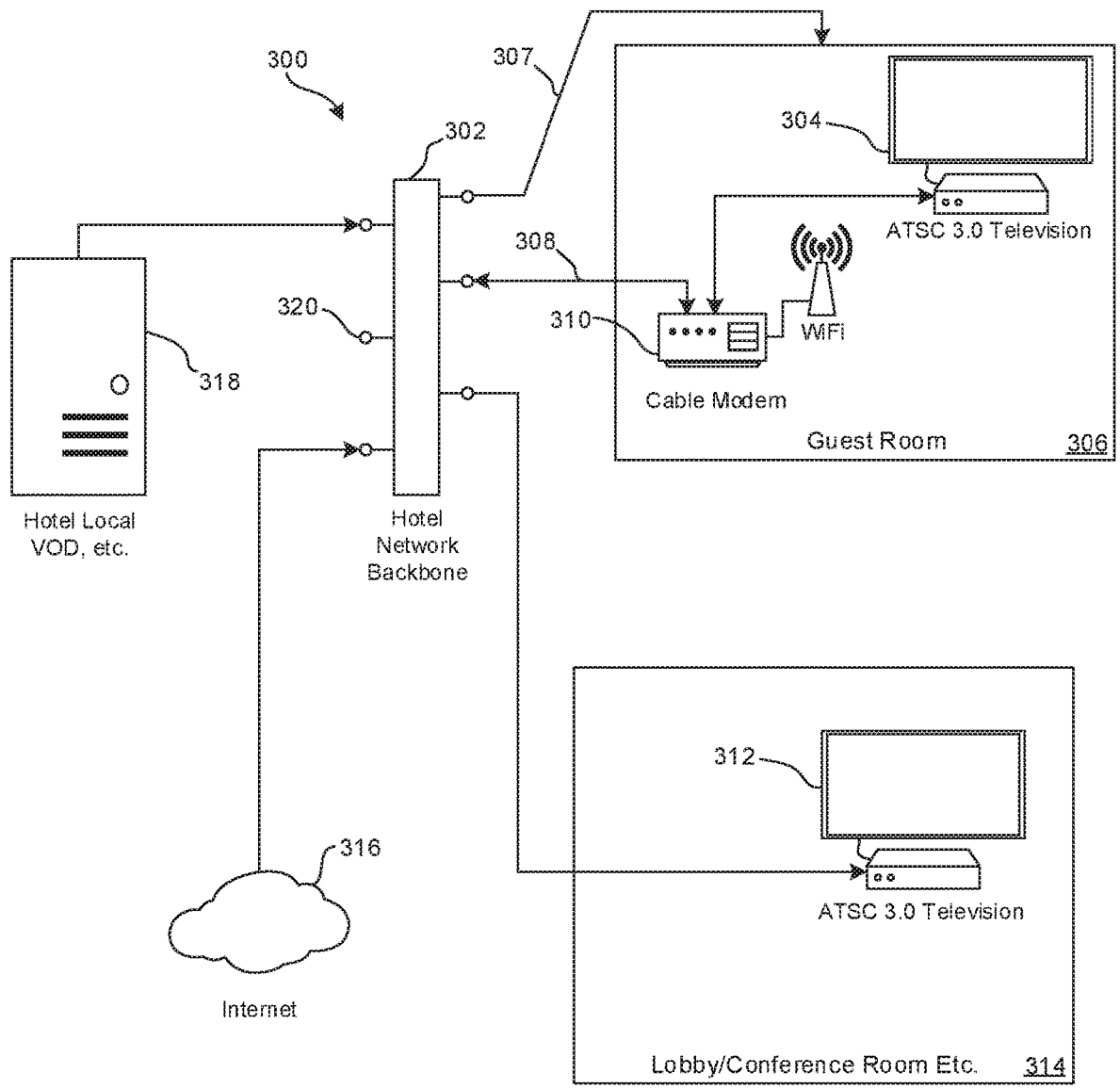
FIG. 3 illustrates an example hospitality establishment TV system, showing only a single room for clarity.

FIG. 3 illustrates a system 300 with components that may have some or all of the components and techniques described above. A hospitality establishment (such as a hotel) network backbone 302, which may have one or more attached servers with associated processors (implemented, if desired, by one or more personal computers or other appropriate computer), can broadcast audio video (AV) content to one or more ATSC 3.0 televisions (TVs) 304 in respective spaces 306 of the establishment via wireless broadcast links 307, which may be implemented as Wi-Fi links or other link such as low power links. Each TV may be disposed in a respective guest hotel room. In addition, or alternatively, the backbone 302 may send AV content to the TV 304 over a wired and/or wireless computer link 308 via an appropriate modem 310 such as a cable modem. For interactivity, the TV's existing network (e.g., Ethernet) connection can provide a return channel back to the backbone 302 with the existing internet connection. Examples of network links include 802.3 Ethernet and 802.11 Wi-Fi or other appropriate link.

In any case, note that the TVs in FIG. 3 need only to connect to a radiofrequency (RF) cable or receive RF broadcast with their respective ATSC 3.0 tuners to watch cable or OTA programming. Thus, the TVs do not receive data from set-top boxes (STBs) or set-back boxes (SBBs), which need not be present in the system 300.

Also, the backbone 302 may send AV content to one or more public TVs 312 in public spaces 314 of the hospitality establishment such as a hotel lobby or hotel conference room. Thus, present techniques may be used for a kiosk or information displays in a hotel other than guest rooms, or in other venues such as airports or other venues. Leveraging present techniques for such purposes (kiosks, flight information displays, conference announcements, etc.) result in lower cost, easier development using widely available tools, and inventory savings (no need to acquire several different sorts of devices).

The AV content may be received by the backbone 302 over the Internet 316, a local repository 318 of video-on-demand (VOD) streams, or a broadcast, satellite, or cable input 320.

Present principles understand that many hotels are already cabled for an in-house cable distribution system and also for wired Ethernet either via dedicated Ethernet wiring or via a cable modem or cable modem-like system. The ATSC 3.0 TVs 304 can use the existing signal distribution infrastructure. Furthermore, encryption is available in ATSC 3.0, hence pay-per-view (PPV) service is facilitated. TVs are uniquely addressable and can provide a run time environment for the hotel TV application, which is defined by ATSC A/344, incorporated herein by reference.

Figure 4:
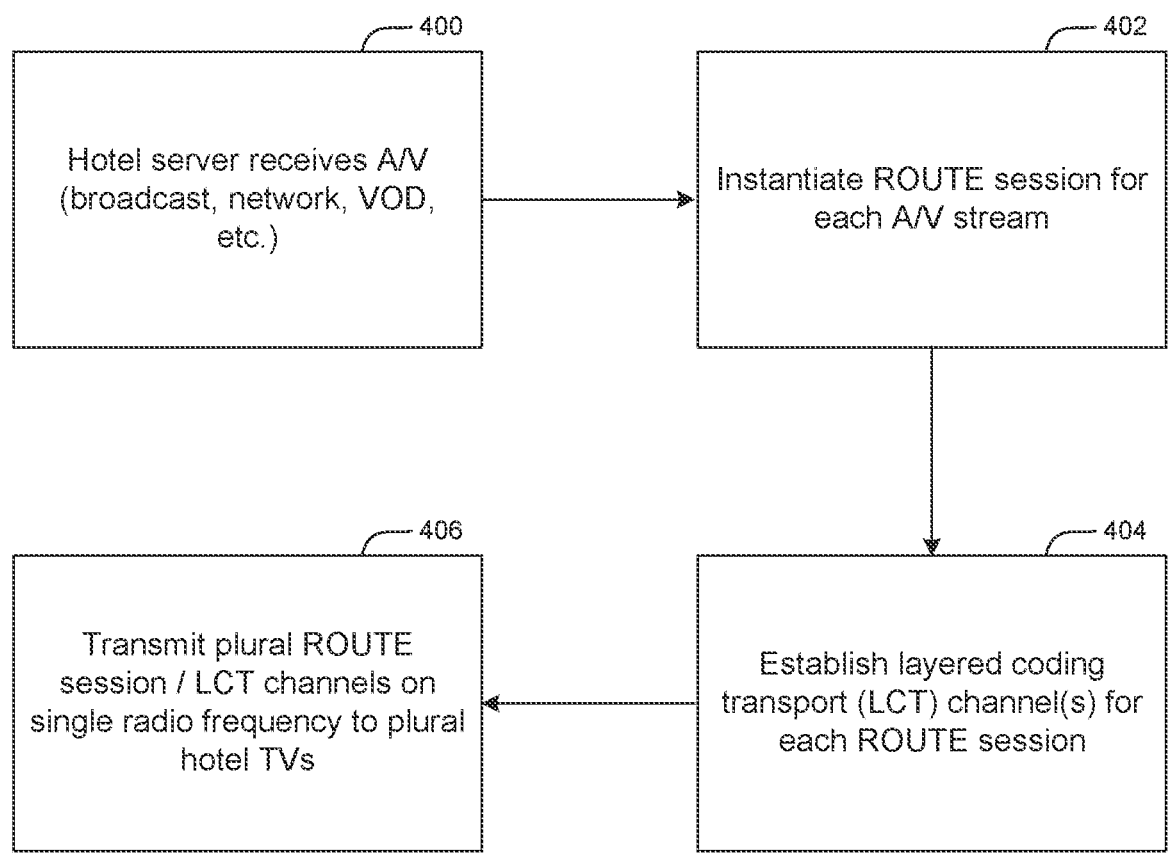

FIG. 4 illustrates example techniques that may be executed by the backbone 302 shown in FIG. 3. Commencing at block 400, the backbone 302/servers thereof receive AV content or streams via the Internet, broadcast, VOD, etc. Moving to block 302, for each AV stream, a ROUTE session is instantiated. In addition to or in lieu of ROUTE, MMTP and/or HTTP can be used.

Proceeding to block 404, for each ROUTE session, a layered coding transport (LCT) channel is established, and moving to block 406 the plural LCT channels carrying e.g., multiple audio tracks or closed captions, are transmitted on a single RF to the plural TVs 304/312 shown in FIG. 3. "ATSC Recommended Practice: Techniques for Signaling, Delivery and Synchronization" (A/351), incorporated herein by reference, provides further information in this regard. The transmission may be via Wi-Fi, and any return link from the TVs to the backbone also may be via Wi-Fi.

Note that existing combiners of RF signals can be used in the above process, or a dedicated PC can be used to extract all program ROUTE SESSIONS across the RF channels and provide them out over Ethernet or broadcast. This can simplify connections further by having only one Ethernet connection.

The single RF that is used to send the ROUTE sessions (which carry respective AV streams) may be channel 0 (zero) or other dedicated/selected channel for the hotel/apartment complex/hospitality/etc. building. By using a respective ROUTE session for each AV program or stream, all combined onto one RF, bandwidth is efficiently exploited. Media services also can be provided on LCT channels with the unique ROUTE sessions for each program service.

FIG. 5 illustrates that plural RF channels can be used to identify floors of the building or parse out sections of AV service if desired. For example, at block 500 a first group of ROUTE sessions may be transmitted on a first single RF while at block 502 a second group of ROUTE sessions may be transmitted on a second single RF. The first RF may be sent to TVs on a first floor or first set of floors in the hospitality establishment, while the second RF may be sent to TVs on a second floor or second set of floors in the hospitality establishment. Or, the first RF may carry ROUTE sessions carrying content of a first type, e.g., family viewing, while the second RF may carry ROUTE sessions carrying content of a second type, e.g., mature audiences.

FIG. 6 illustrates logic that may be implemented in any of the TVs described herein. Commencing at block 600, recognizing that the software stack of an ATSC 3.0 TV lends itself to providing the functionality of a hotel TV system without additional hardware, a software application may be downloaded by the TV. In some embodiments the TV receives a hotel TV system-specific application from, e.g., the backbone 302 in FIG. 3 or other source. Alternately, the system-specific application may be delivered from a central site over an IP/Internet path, yielding the additional feature of centralized control, look and feel, and distribution of application(s). Note that the TV may first be tuned to a desired RF channel to select a service and download the application.

Moving to block 602, the TV is tuned to the single RF carrying the desired AV streams. A program guide such as that shown in FIG. 7 may be presented at block 604, from whence a selection of an AV stream (equivalently, the ROUTE session for the desired AV stream) is received at block 606. The selected ROUTE session (AV stream or program) is played on the TV at block 608.

Figure 7:
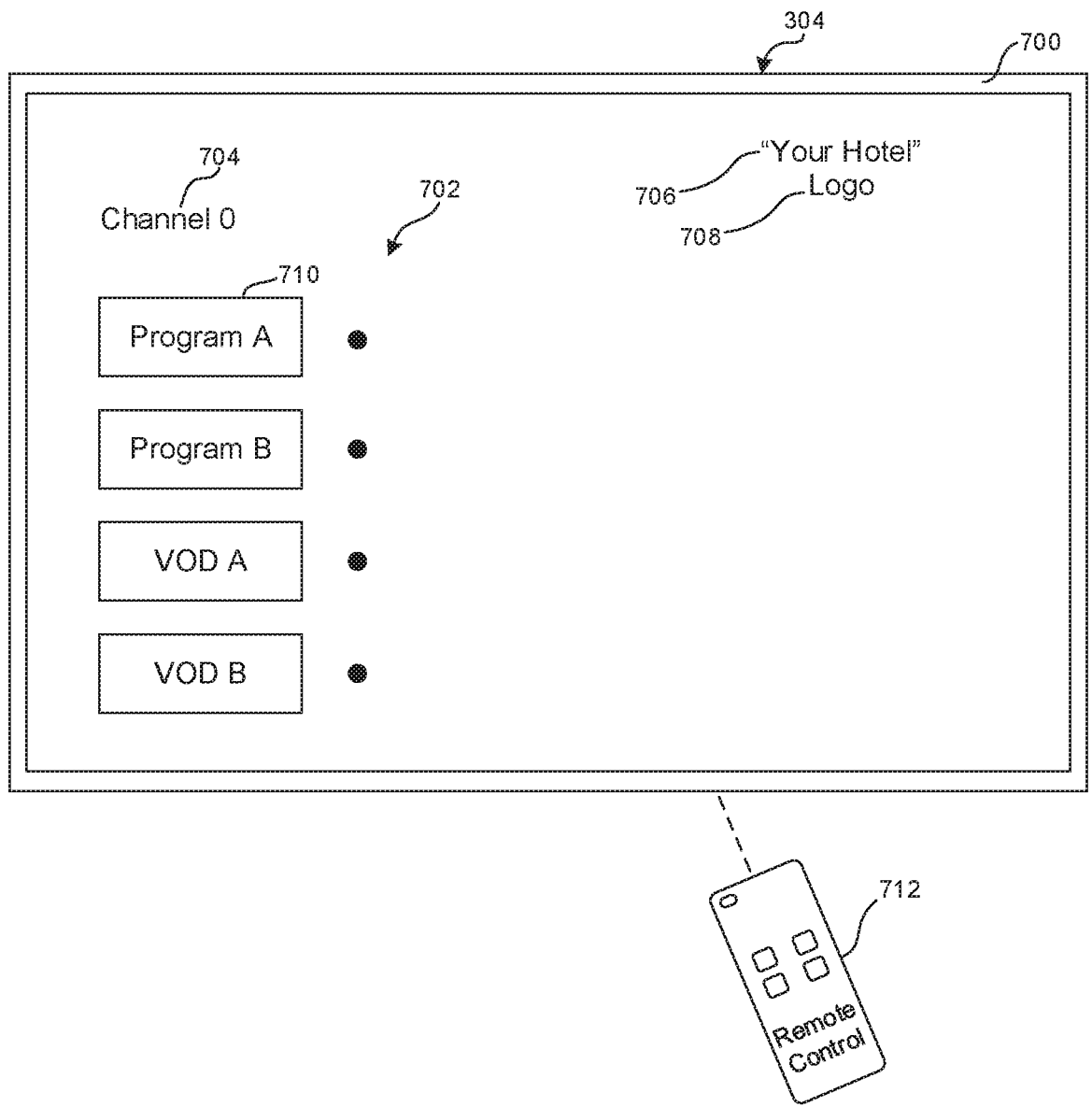
FIG. 7 illustrates an example program guide consistent with present principles.

Turn now to FIG. 7, showing a video display 700 of an example TV 304 presenting a program guide 702 in accordance with the application received at block 600 in FIG. 6. The program guide 702 may include a channel indication 704 indicating the single RF currently tuned-to, in the example shown, "channel 0". The program guide 702 also may include an establishment name 706 and logo 708, as instantiated by the application. The program guide 702 may further include plural program selectors 710 indicating the AV streams carried in the ROUTE session/LCT channels on the single RF indicated at 704. A selector 710 may be selected using, e.g., a wireless remote commander 712 to cause the TV 304 to present the selected AV program.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

It will be appreciated that whilst present principals have been described with reference to some example embodiments, these are not intended to be limiting, and that various alternative arrangements may be used to implement the subject matter claimed herein.

What is claimed is:

1. A digital television system comprising:
at least one hospitality system server comprising at least one server processor programmed with instructions to:
receive plural audio video (AV) streams;
establish a real-time object delivery over unidirectional transport (ROUTE) session for each AV stream;
associate each ROUTE session with a respective layered coding transport (LCT) channel; and
transmit plural ROUTE sessions over a single radiofrequency (RF) to plural TVs in a hospitality establishment for selection of AV streams for play on the TVs, wherein the TVs do not receive data from set-top boxes (STBs) or set-back boxes (SBBs), wherein the plural ROUTE sessions are first ROUTE sessions, the single RF is a first RF, the TVs are first TVs, and the instructions are executable to:
transmit second ROUTE sessions on a single second RF to plural second TVs in the hospitality establishment, the first TVs being on a first floor or first set of floors in the hospitality establishment, the second TVs being on a second floor or second set of floors in the hospitality establishment.

2. The digital television system of claim 1, wherein the TVs are advanced television systems committee (ATSC) 3.0 TVs.

3. The digital television system of claim 1, comprising the TVs.

4. The digital television system of claim 3, wherein at least some of the TVs are disposed in respective hotel guest rooms and the single RF is over Wi-Fi.

5. The digital television system of claim 3, wherein at least one of the TVs is disposed in a public room of a hotel other than a hotel guest room.

6. The digital television system of claim 1, wherein the instructions are executable to:
send to the TVs at least one application operable to select an AV stream from the single RF.

7. The digital television system of claim 6, wherein the application comprises an advanced television systems committee (ATSC) 3.0 application configured to present a user interface.

8. A digital television system comprising:
at least one hospitality system server comprising at least one server processor programmed with instructions to:
receive plural audio video (AV) streams;
establish a real-time object delivery over unidirectional transport (ROUTE) session for each AV stream;
associate each ROUTE session with a respective layered coding transport (LCT) channel; and
transmit plural ROUTE sessions over a single radiofrequency (RF) to plural TVs in a hospitality establishment for selection of AV streams for play on the TVs, wherein the TVs do not receive data from set-top boxes (STBs) or set-back boxes (SBBs),
wherein the plural ROUTE sessions are first ROUTE sessions, the single RF is a first RF, the TVs are first TVs, and the instructions are executable to:
transmit second ROUTE sessions on a single second RF to plural second TVs in the hospitality establishment, the first ROUTE sessions carrying content of a first type, the second ROUTE sessions carrying content of a second type.

9. A method comprising:
arranging plural sessions comprising real-time object delivery over unidirectional transport (ROUTE) sessions and/or plural motion pictures expert group (MPEG) media transport protocol (MMTP) sessions and/or plural hypertext transfer protocol (HTTP) sessions into respective RF channels; and
broadcasting the sessions on a radiofrequency (RF) from a source to plural TVs in respective spaces of an establishment, and/or sending the sessions over a wired and/or wireless computer network link from the source to the plural TVs; wherein the plural sessions are only first sessions, the TVs are first TVs, and the method comprises at least one of:
broadcast only second sessions from the source to plural second TVs in respective spaces of the establishment, the first sessions carrying content of a first type, the second sessions carrying content of a second type; and/or
transmit second sessions to plural second TVs, the first TVs being on a first floor or first set of floors in the establishment, the second TVs being on a second floor or second set of floors in the establishment.

10. The method of claim 9, comprising arranging plural ROUTE sessions into respective RF channels.

11. The method of claim 9, comprising arranging plural MMTP sessions into respective RF channels.

12. The method of claim 9, comprising arranging plural HTTP sessions into respective RF channels.

13. The method of claim 9, comprising broadcasting ROUTE sessions on a single RF from the source to the plural TVs.

14. The method of claim 9, comprising sending ROUTE sessions over a wired computer network link from the source to the plural TVs.

15. The method of claim 9, comprising sending ROUTE sessions over a wireless computer network link from the source to the plural TVs.

16. An assembly comprising:
at least one server;
plural TVs in respective spaces;
the plural TVs comprising advanced television systems committee (ATSC) receivers configured to receive audio video (AV) programs from the server, wherein the server is programmed with instructions to establish plural real-time object delivery over unidirectional transport (ROUTE) sessions for respective AV programs, the plural ROUTE sessions comprising first ROUTE sessions and second ROUTE sessions, the instructions being executable to:
transmit only the first ROUTE sessions to first TVs on a first floor of an establishment and transmit only the second ROUTE sessions to second TVs on a second floor of the establishment.

17. The assembly of claim 16, wherein the TVs are configured to receive the AV programs sourced from the server on a single radiofrequency (RF) via the respective ATSC 3.0 receivers.

18. The assembly of claim 16, wherein the TVs are configured to receive the AV programs sourced from the server on a wired computer network link.

19. The assembly of claim 16, wherein the TVs are configured to receive the AV programs sourced from the server on a wireless computer network link.

20. An assembly comprising:
at least one server;
plural TVs in respective spaces of an establishment;
the plural TVs comprising advanced television systems committee (ATSC) receivers configured to receive audio video (AV) programs from the server, wherein the server is programmed with instructions to establish plural real-time object delivery over unidirectional transport (ROUTE) sessions for respective AV programs, the plural ROUTE sessions comprising first ROUTE sessions and second ROUTE sessions, the instructions being executable to:
transmit only the first ROUTE sessions to first TVs in the establishment and transmit only the second ROUTE sessions to second TVs in the establishment, the first ROUTE sessions carrying content of a first type, the second ROUTE sessions carrying content of a second type.

21. The assembly of claim 20, wherein the TVs are configured to receive the AV programs sourced from the server via the respective ATSC receivers.

22. The assembly of claim 20, wherein the TVs are configured to receive the AV programs sourced from the server on a wired computer network link.

23. The assembly of claim 20, wherein the TVs are configured to receive the AV programs sourced from the server on a wireless computer network link.

* * * * *